US009506671B2

(12) United States Patent
Gröppel et al.

(10) Patent No.: US 9,506,671 B2
(45) Date of Patent: Nov. 29, 2016

(54) HEAT TRANSFER MEDIUM, USE THEREOF, AND METHOD FOR OPERATING A SOLAR THERMAL POWER PLANT

(75) Inventors: Peter Gröppel, Erlangen (DE); Pascal Heilmann, Lauter (DE); Matthias Übler, Ursensollen (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 918 days.

(21) Appl. No.: 13/876,311

(22) PCT Filed: Sep. 1, 2011

(86) PCT No.: PCT/EP2011/065136
§ 371 (c)(1),
(2), (4) Date: Mar. 27, 2013

(87) PCT Pub. No.: WO2012/041634
PCT Pub. Date: Apr. 5, 2012

(65) Prior Publication Data
US 2013/0180519 A1 Jul. 18, 2013

(30) Foreign Application Priority Data
Sep. 27, 2010 (DE) .................. 10 2010 041 460

(51) Int. Cl.
| H01L 31/052 | (2014.01) |
| F24J 2/46 | (2006.01) |
| C01D 3/02 | (2006.01) |
| C01D 5/00 | (2006.01) |
| C01D 7/00 | (2006.01) |
| C01D 15/04 | (2006.01) |
| C01D 15/10 | (2006.01) |
| C01F 11/36 | (2006.01) |
| C09K 5/12 | (2006.01) |
| F24J 2/34 | (2006.01) |
| F28D 20/00 | (2006.01) |

(52) U.S. Cl.
CPC ............ *F24J 2/4649* (2013.01); *C01D 3/02* (2013.01); *C01D 5/00* (2013.01); *C01D 7/00* (2013.01); *C01D 15/04* (2013.01); *C01D 15/10* (2013.01); *C01F 11/36* (2013.01); *C09K 5/12* (2013.01); *F24J 2/34* (2013.01); *F28D 20/003* (2013.01); Y02E 10/46 (2013.01); Y02E 60/142 (2013.01); Y02E 70/30 (2013.01); Y02P 20/134 (2015.11)

(58) Field of Classification Search
CPC .......... C01D 15/04; C01D 15/10; F24J 2/34; F24J 2/46; H01L 31/052

USPC ............... 126/679, 714; 252/67, 69, 71
See application file for complete search history.

(56) References Cited

U.S. PATENT DOCUMENTS

| 4,303,121 A * | 12/1981 | Pangborn | F28D 20/003 126/263.01 |
| 4,563,295 A | 1/1986 | Erickson | |
| 7,588,694 B1 * | 9/2009 | Bradshaw | C01B 21/48 252/67 |
| 2003/0000517 A1 * | 1/2003 | Joseph | B65D 81/3484 126/263.06 |
| 2005/0247906 A1 * | 11/2005 | Neuschutz | C04B 22/085 252/70 |
| 2009/0020264 A1 | 1/2009 | Morita et al. | |
| 2010/0038581 A1 * | 2/2010 | Gladen | C01D 9/00 252/67 |
| 2012/0056125 A1 * | 3/2012 | Raade | C09K 5/12 252/71 |
| 2013/0015405 A1 * | 1/2013 | Quintero | B01D 71/025 252/373 |
| 2013/0284970 A1 * | 10/2013 | Groppel | C09K 5/12 252/71 |

FOREIGN PATENT DOCUMENTS

| DE | 3038844 | 4/1982 |
| DE | 3831631 | 3/1990 |
| DE | 19859658 | 6/2000 |
| DE | 102009010358 | 7/2010 |
| DE | 102010041460.3 | 9/2010 |
| EP | 0049761 | 4/1982 |
| EP | 1087003 | 3/2001 |
| WO | 2008/071205 | 6/2008 |
| WO | PCT/EP2011/065136 | 9/2011 |

OTHER PUBLICATIONS

International Search Report for PCT/EP2011/065136, mailed on Nov. 30, 2011.
European Office Action for related European Patent Application No. 11751901.7, issued Jan. 6, 2014, 6 pages.
WIPO English language translation of International Preliminary Report on Patentability for PCT/EP2011/065136, downloaded from WIPO website Mar. 18, 2014, 7 pages.
German Office Action for German Priority Patent Application No. 10 2010 041 460.3, issued Jun. 3, 2011, 6 pages.

* cited by examiner

*Primary Examiner* — Gregory Huson
*Assistant Examiner* — Nikhil Mashruwala
(74) *Attorney, Agent, or Firm* — Slayden Grubert Beard PLLC

(57) ABSTRACT

A heat transfer medium is used in solar thermal power plants. The heat transfer medium can reversibly absorb and release water. The heat transfer medium releases water during heating and releases heat during re-absorption of the water.

5 Claims, No Drawings

HEAT TRANSFER MEDIUM, USE THEREOF, AND METHOD FOR OPERATING A SOLAR THERMAL POWER PLANT

CROSS REFERENCE TO RELATED APPLICATIONS

This application is based on and hereby claims priority to International Application No. PCT/EP2011/065136 filed on Sep. 1, 2011 and German Application No. 10 2010 041 460.3 filed on Sep. 27, 2010, the contents of which are hereby incorporated by reference.

BACKGROUND

The invention relates to a heat transfer medium, in particular for use in solar thermal power plants, and a method for operating a solar thermal power plant.

Energy production by solar thermal power plants, which are based on the technologies of parabolic trough and Fresnel reflectors, heliostats and solar towers, is becoming increasingly important.

Solar thermal power plant concepts normally use solar power, in order—by beam concentration and bundling mechanisms, such as for example a multitude of cascaded mirror geometries—to heat up a heat transfer fluid (HTF) or heat transfer medium within an expanded absorber pipeline circuit which then converts liquid water from a reservoir into high-pressure water vapor via a heat exchange process, in order thereby to generate electricity by a turbine. The cooled HTF runs through the heating process again by solar power and ensures continuous power generation.

The heat transfer medium used in this solar field primary circuit is subject to stringent requirements. Such a fluid should therefore in particular have a very low liquidus temperature, since rapid cooling may otherwise result in solidification within the absorber pipe in the absence of solar radiation. This risk is particularly prevalent in the hours of darkness, when such a power plant does not produce any electricity per se. This solidification may possibly be counteracted during the night by external combustion (e.g. energy withdrawal from a hot thermal reservoir, known as Thermal Energy Storage or TES, electrical heat tracing or even thermostatic control by supplying combustion heat from fossil fuels such as gas), in order to maintain the fluid phase state and thus the pumpability of the HTF. Accordingly, the higher the melting point or liquidus temperature of the heat transfer medium, the more intensive the unwanted internal energy consumption for maintaining the heat of the absorber pipe system.

This namely also reduces the effectiveness of a solar thermal power plant complex. At the same time, high maximum operating temperatures (and, similarly, high decomposition temperatures) are required, since the efficiency of a power plant is known to increase disproportionately with the temperature.

To guarantee the maximum lifetime of the solar field circuit pump system and to keep the pump power consumption as low as possible, the HTF should have high fluidity. At the same time, the HTF in the liquid state should combine high thermal conductivity with high specific thermal capacity. All of these factors are what chiefly determine the power generation costs of future solar thermal power plants, and thus the point in time at which economic cost parity is reached and the competitiveness of such plants.

There is therefore a great deal of interest in the quest for novel, non-toxic, low-melting (with melting temperatures preferably below 100° C.), thermally stable and highly fluid heat transfer media with low procurement costs in the multitonne range.

The non-eutectoid mixture of 60% by weight of $NaNO_3$ and 40% by weight of $KNO_3$, known as solar salt, which has a melting temperature of 240° C., is known for this purpose.

However, a relatively high melting point such as this can result in inefficiency in a solar thermal power plant for use in the high megavoltage range. Admixing, i.e. ternerization and quaternization of the established Na—K—$NO_3$ mixture, by further cations with different ionic radii, is used to reduce the melting temperature. The ternerization of the cation quantity with Ca2+ ions in the form of calcium nitrate additions (cation base: 21 mol.-% Ca2+, 49 mol.-% K+, 30 mol.-% Na+) thus leads to a reduction in the liquidus temperature to 133° C. (cf. "Phase Diagrams for Ceramists", E. M. Levin, C. R. Robbins, H. F. McMordie (Eds.), Volume I and II, American Ceramic Society, 1964).

U.S. Pat. No. 7,588,694 B1 discloses a heat transfer medium which is based on solar salt, into which is mixed different calcium salts to lower the melting point; a lowering of the melting point is also effected by the addition of lithium cations.

By further admixture of lithium ions in the form of $LiNO_3$, U.S. Pat. No. 7,588,694 B1 states that melting ranges of Ca—NaK—Li—$NO_3$ mixtures at approx. 97° C. can be achieved.

Even though the use of nitrates, which—as fertilizer waste—have been virtually unused to date, may indeed be highly economical, the use of lithium salts as an HTF medium for the purposes of commercial, industrial-scale implementation in the solir thermal power plant sector is precluded, since it is expected that, in the future, there will be increased competition for scarce global supplies of lithium-based material from the accumulator industry, which uses lithium salts for the preparation of lithium-ion batteries.

SUMMARY

One possible object is to improve the known, preferably eutectic, nitrate salt mixtures, so that a lower melting point for the salt is achieved with a thermal stability and viscosity comparable to that of solar salt, or at least with a viscosity that allows it to be used in solar thermal power plants.

The inventors propose a heat transfer medium for solar power plants, which can store water, wherein the water is absorbed into the medium exothermically and is released endothermically. The inventors furthermore propose a method for operating a solar thermal plant, wherein a heat transfer medium is used which, when exposed to solar radiation, stores heat and continuously releases water, wherein the released water is separated from the liquid heat transfer medium by condensation and is stored, wherein, when required, i.e. for example during nighttime operation or otherwise in the absence of solar rays, the stored water can be added back to the heat transfer medium, whereby the salt hydrates are formed again in the exothermic reaction and the liquidity of the heat transfer medium is preserved by the released thermal energy. The subject matter is ultimately the use of the heat transfer mediums in solar power plants.

The subject matter is, in particular, a heat transfer medium based on a mixture of two or more components, with one or more components being added to the mixture as salt hydrate(s), which can be thermally dehydrated without decomposition and are selected from the compounds $K_2HPO_4.xH_2O$, $KF.xH_2O$, $CaC_{12}.xH_2O$, $LiNO_3.xH_2O$, $Na_2SO_4.xH_2O$, $Na_2CO_3.xH_2O$, $LiBr.xH_2O$, $CaBr_2.xH_2O$, $Na_2HPO_4.xH_2O$, $Ca(NO_3)_2.xH_2O$, $Na_3PO_4.xH_2O$, $Na_4P_2O_7.xH_2O$, $LiCl$—.$xH_2O$, wherein x has a value of from 1 to 12.

Preferably, a mixture is obtained which, compared to solar salt, has a slightly reduced thermal stability (Tmax=480-500° C.) and displays a reasonably increased viscosity, yet has a melting point that is significantly reduced (~100° C.), but does not use lithium salts.

Through the use of low-cost, non-toxic, temperature-stable, (crystal) water-free nitrates of the cation types sodium (Na+), potassium (K+) and calcium (Ca2+), which are available in large tonnages, an HTF mixture with a melting point of 133° C., which is known to the person skilled in the art and from the literature, can be implemented. By substituting the anhydrous calcium nitrate $Ca(NO_3)_2$ which is normally used, with the significantly cheaper tetrahydrate derivative $Ca(NO_3)_2.4H_2O$, which contains water of crystallization, a (partially) liquefying fluid is obtained at a significantly lower temperature than 133° C. The reason for this could be that the water of crystallization-free calcium nitrate has a melting point of 561° C., whereas the variant containing water of crystallization melts congruently even at 42° C., as established in 2002 by the publication by W. Voigt, D. Zeng, Solid-liquid equilibria in mixtures of molten salt hydrates for the design of heat storage materials, in Pure Appl. Chem., 74: (10), 1909-1920 (2002).

By maintaining the cation stoichiometry necessary for the said eutectic, such a combination produces a mixture which forms a semi-liquid or partially liquid phase mixture at well below 133° C., since—when heated over 45° C.—the liquid calcium nitrate-tetrahydrate functions as a solvent for the sodium nitrate and potassium nitrate components. From 95-100° C., such a mixture at ambient pressure represents a completely solvent phase, i.e. sediment-free and extremely free-flowing, and therefore (fully) liquid.

However, further heating of such a mixture above 100° C. surprisingly does not result in any excessive boiling of the water of crystallization in the form of water vapor; instead, as a result of electrostatic attraction by the mobile ions of the fluid phase, it merely leads to a very slow, continuous and easily manageable evaporation, so that it is only in the higher temperature ranges, i.e. well over 133° C., that dehydration is completed. Since the eutectic melting temperature is reached at 133° C., from this temperature the molten eutectic of Ca—Na—K—NO3 represents the continuous, molten phase, which in turn acts as the solvent for the remaining water of crystallization. In this way, by using inexpensive and well-known raw materials, a medium that may be used as HTF fluid is obtained, which generates only low to moderate vapor pressures across wide temperatures ranges and has a melting point of approx. 100° C. at normal pressure.

However, further heating in excess of 100° C. does not result in spontaneous and excessive boiling of the approx. 15% water of crystallization content by weight; since the ionic nature of the cations and anions prevents spontaneous evaporation, the vapor pressure of the water is effectively reduced. Thus, if the liquid, fluid phase is maintained in the range of 100-133° C., this does not result in the precipitation of one or more components of the salt mixture. Upon further heating the eutectic produces the continuous phase from 133° C., so that, up to the maximum working temperature of 500° C., the combined water of crystallization is continuously released. This volatile water of crystallization may be temporarily stored by a condensation process and, upon cooling of the solar field circuit (e.g. during nighttime operation), is available for the restoration of the low melting point with reversible formation of the salt hydrate calcium nitrate-tetrahydrate. Since, when the tetrahydrate is formed by the addition of water, the hydration enthalpy of −51.5 kJ/mol or −314 kJ/kg (with reference to the calcium nitrate component) is recovered in the form of heat, this energy is reversibly available for maintaining the fluid temperature.

Hydration enthalpy of the sodium hydrate calcium nitrate tetrahydrate is known from W. W. Ewing et al., Calcium Nitrate III. Heats of Hydration and of Solution of the binary system Calcium Nitrate-Water, J. Am. Chem. Soc, 54: (4), 1335-1343 (1932).

In this way, the implementation of an HTF medium based on "solar salt", with a melting point of approx. 100° C., is achieved without the use of expensive third and fourth additions of salt.

The mixture of two or more components which form a eutectic in a water of crystallization-free mixture is preferred, a mixture of sodium and potassium nitrate, with calcium nitrate-tetrahydrate, calcium nitrate-trihydrate, calcium nitrate-dihydrate and/or calcium nitrate monohydrate being added as the third component.

By a novel heat transfer medium concept for use in solar thermal power plants, as described and disclosed here for the first time, it is possible for the melting point to be selected between specific limits, which are largely defined by the water content.

DETAILED DESCRIPTION OF THE PREFERRED EMBODIMENT

Reference will now be made in detail to the preferred embodiments of the present invention, examples of which are illustrated in the accompanying table.

In a preferred embodiment, it is advantageous if the cation ratio is for example in the range Ca2+ 25-35 mol.-%, Na+: 15-25 mol.-%, K+: 45-55 mol.-%.

By the appropriate choice of cation ratio, the melting point can be set within specified limits.

According to an advantageous embodiment, the mixture melts in the anhydrous state in the range 110-140° C.

According to an advantageous embodiment, the mixture is partially liquid in the temperature range from 50° C.-to 70° C. "Partially liquid" means when the liquid is flowing but has a sediment.

According to an advantageous embodiment, the mixture is liquid in the temperature range from 95° C. to 120° C., and preferably from 95° C. to 110° C.

According to a preferred embodiment, the heat transfer medium is dehydratable without decomposition at temperatures over 400° C., particularly preferred at temperatures over 450° C. and completely preferred at temperatures up to 500° C.

According to a further advantageous embodiment, the heat transfer medium additionally has water mixed with it, in particular so that liquefaction is facilitated at temperatures below 100° C.

In the embodiment in which water is added, it is preferable for water to be added in a quantity of 0.1 to 30% by weight.

The proposals are described again in further detail below on the basis of an exemplary embodiment.

TABLE 1

Example of an inventive mixture

| Salt | M [g/mol] (containing hydrocarbons 1) | M [g/mol] (hydrocarbon-free 2) | Weight of sample [g] | Cation ratio [mol.-%] | Cation content [mol] | H$_2$O proportion [mol] | H$_2$O proportion [g] |
|---|---|---|---|---|---|---|---|
| Ca(NO$_3$)$_2$·4H$_2$O | 236.15 | 164.09 | 512.51 | 30 | 2.17 | | |
| NaNO$_3$ | | 84.99 | 129.12 | 21 | 1.52 | | |
| KNO$_3$ | | 101.10 | 358.38 | 49 | 3.54 | 8.68 | 156.39 |

1 Containing water of crystallization
2 Water of crystallization-free

The said example forms a liquid phase with slight sediment of sodium and potassium nitrate at approx. 50° C., at 85° C. the mixture contains only very slight, undissolved flakes and is single-phase in the 95-105° C. range. With further heating from 100-135° C. at ambient pressure, the water of crystallization does not boil, the liquid phase is continuously low-viscosity up to 133° C. and a fixed nitrate species sediment does not develop. Following application of a vacuum (p=0.1 mbar) and heating at 190° C. for six hours followed by overnight cooling to room temperature under nitrogen protective atmosphere, the softening point was determined at approx. 95° C. This illustrates the strongly reduced tendency of the water of crystallization release and/or the distinctive reduction in water vapor pressure in the mixture used.

The invention relates to a heat transfer medium, in particular for use in solar thermal power plants, and a method for operating a solar thermal power plant. Thus, according to the invention, a heat transfer medium is used which can reversibly absorb and release water, whereby the heat transfer medium releases water during heating and releases heat during re-absorption of the water.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide* v. *DIRECTV*, 69 USPQ2d 1865 (Fed. Cir. 2004).

The invention claimed is:

1. A heat transfer medium for a solar power plant, wherein:
   the heat transfer medium can store water,
   the heat transfer medium absorbs water exothermically,
   the heat transfer medium desorbs water endothermically,
   the heat transfer medium comprises a mixture of two or more components,
   at least one of the components is a salt hydrate, which thermally dehydrates without decomposition,
   the salt hydrate is at least one hydrate selected from the group consisting of K2HPO4.xH2O, KF.xH2O, CaCl2.xH2O, LiNO3.xH2O, Na2SO4.xH2O, Na2CO3.xH2O, LiBr.xH2O, CaBr2.xH2O, Na2HPO4.xH2O, Ca(NO3)2.xH2O, Na3PO4.xH2O, Na4P2O7.xH2O, LiCl—.xH2O, wherein x has a value of 1 to 12,
   the heat transfer medium melts in an anhydrous state at a temperature of from 110 to 140° C.
   the heat transfer medium is partially liquid at a temperature of from 50° C. to 70° C.,
   the heat transfer medium is liquid at a temperature of from 95° C. to 120° C., and
   the heat transfer medium dehydrates without decomposition at temperatures over 400° C.

2. The heat transfer medium as claimed in claim 1, wherein the heat transfer medium further comprises water mixed with the mixture.

3. The heat transfer medium as claimed in claim 1, wherein water is added in a quantity of 0.1 to 30% by weight.

4. The heat transfer medium as claimed in claim 1, wherein the heat transfer medium is a mixture of sodium nitrate, potassium nitrate and Ca(NO$_3$)$_2$.xH$_2$O wherein x has a value of 1-4.

5. The heat transfer medium as claimed in claim 1, wherein the heat transfer medium contains no lithium.

* * * * *